(12) United States Patent
Bobbs et al.

(10) Patent No.: US 6,448,684 B1
(45) Date of Patent: Sep. 10, 2002

(54) ROTATABLE INSULATOR FOR HOLDING ELECTRIC MOTOR BRUSHES

(75) Inventors: William C. Bobbs, Indianapolis, IN (US); Stephen A. Oehrle, Franklin, IN (US); Dale M. Sutton, Boggstown, IN (US); Robbie K. Hall, Shelbyville, IN (US)

(73) Assignee: Bo-Witt Products, Inc., Edinburgh, IN (US)

( * ) Notice: Subject to any disclaimer, the term of this patent is extended or adjusted under 35 U.S.C. 154(b) by 0 days.

(21) Appl. No.: 09/538,362

(22) Filed: Mar. 29, 2000

Related U.S. Application Data

(60) Provisional application No. 60/126,691, filed on Mar. 29, 1999.

(51) Int. Cl.[7] .......................... H02K 13/00; H02K 5/00
(52) U.S. Cl. ...................... 310/239; 370/241; 370/42
(58) Field of Search .................. 310/238, 239, 310/240, 241, 242, 42

(56) References Cited

U.S. PATENT DOCUMENTS

| | | | | |
|---|---|---|---|---|
| 1,548,875 A | * | 8/1925 | Ferguson | 310/239 |
| 1,744,998 A | * | 1/1930 | Wisler | 310/239 |
| 2,195,801 A | * | 4/1940 | Thibault | 310/239 |
| 3,584,248 A | * | 6/1971 | Higashino | 310/68 |
| 4,406,963 A | * | 9/1983 | Wolf et al. | 310/239 |
| 5,264,749 A | * | 11/1993 | Maeda et al. | 310/154 |
| 5,955,802 A | * | 9/1999 | Karasa et al. | 310/50 |
| 6,144,134 A | * | 11/2000 | Lin | 310/239 |

* cited by examiner

Primary Examiner—Nicholas Ponomarenko
Assistant Examiner—Dang Dinh Le
(74) Attorney, Agent, or Firm—Bose McKinney & Evans LLP (57) ABSTRACT

An apparatus for positioning at least one motor brush in an electric motor having a motor housing, comprising a base ring secured to the motor housing, an upper ring disposed adjacent to and moveable relative to the base ring, and an indexing member for aligning the upper ring with the base ring. The base ring includes a first indexing portion, an axially inwardly facing surface disposed adjacent to the motor housing and a second axially outwardly facing surface offset from the first axially inwardly facing surface. The upper ring includes a second indexing portion, a third axially inwardly facing surface disposed adjacent to the second axially outwardly facing surface of the base ring and a fourth axially outwardly facing surface offset outward from the third axially inwardly facing surface.

11 Claims, 5 Drawing Sheets

ROTATABLE INSULATOR FOR HOLDING ELECTRIC MOTOR BRUSHES

CLAIM OF PRIORITY

This application claims the benefit of U.S. Provisional Application No. 60/126,691, filed on Mar. 29, 1999.

TECHNICAL FIELD OF THE INVENTION

The present invention relates to an apparatus for holding motor brushes in an electric motor, and more particularly to an insulator/mounting ring for an electric motor that is especially adaptable for use in industrial electric motors.

BACKGROUND OF THE INVENTION

Today the electric motor is the method of choice to supply mechanical/electrical energy within industrial environments. As with any other electromechanical device, electric motors require periodic maintenance to ensure that they are working properly and at the highest efficiency level possible. One area that requires periodic maintenance is the carbon brushes in the motor. These brushes need to be replaced periodically in order to provide the maximum transfer of electric current between the stator and armature of the motor.

The user's ability to replace the carbon brushes is largely dependent upon the environment in which the motor resides. Some environments permit easy maintenance access to a motor and its brushes, thereby making replacement of the brushes quite easy and quick. However, other environments provide very restricted access to the motor and its brushes. These restricted access environments include those associated with large electric motors such as those found in motors that power heavy industrial machinery and those that power diesel-electric locomotives. In such restricted maintenance access environments, the replacement of the motor's brushes can be an extremely time consuming process, often requiring the removal of the motor's housing and insulator ring/brushholder mounting ring.

Typically, the electric motors for which the present invention will be most useful contain four or more carbon brushes equally spaced around the commutator of the motor. Usually, the brushes are disposed around the exterior of the cylindrical commutator and are separated by 90°, with a brush being disposed above, below and on each side of the motor. On some motors, the brushes are disposed at about 0°, 30°, 180°, and 240° from top dead center (TDC). The brushes are accessible through an access door located on the side of the motor housing. However, most such access doors allow access to only those two brushes that are mounted on the same side of the commutator as the access door (e.g. at 30° and 240° from TDC) and do not allow access to the other two brushes (e.g. those at 0° and 180°). This makes it very difficult, if not impossible to change all four brushes in an electric motor without completely disassembling the motor, and removing all or part of it from the housing.

Additionally, the brushes should not be positioned exactly vertically or horizontally around the armature. Typically, the brushes are rotated approximately three degrees from vertical or horizontal. For example the brush mounted to the top of the motor is not centered on the axis of the motor, but rather is rotated three degrees from vertical about the axis of the motor. Nonetheless, the brushes should maintain the critical ninety degree offset from each other.

The difficulty in replacing the brushes results in two undesirable effects. First, motors are not maintained as often as they should be, thereby reducing their efficiency and increasing electricity costs. Second, when a motor is to be repaired, it is typically removed from the environment to which it is operating and replaced by another motor. This requires the factory or industrial facility to maintain a supply of spare motors which therefore increases both labor expense and capital costs. The factory must pay the labor costs to switch out the two motors, transportation costs to move the motor to a repair specialist, as well as the labor costs to have a motor repair specialist disassemble the old motor, replace the brushes and re-assemble the motor. This process typically costs the factory $500.00 to $1,000.00 in extra labor, excessive downtime on the production line due to the added time required to switch out the motors, and the additional costs to maintain a supply of spare motors.

Another problem with current brush mounting systems is that their mounting bolt arrangements add to the difficulty of replacing the brushes. Current brush mounting systems have a ring made of thermo-setting plastic that is secured to the motor housing. The ring typically has four platforms that extend axially outwardly to provide a seat to attach the brush holders. These platforms have a pair of axially extending apertures through which bolts can pass. These apertures are typically longer than the length of the bolt that passes through them. Because of this, the bolts sometimes recede back into this ring when the brush brackets are removed or installed. If this happens, the factory or industrial facility is often forced to completely disassemble the motor again. This process of retrieving the receded bolts adds both additional time as well as frustration to the motor repair specialist during the brush charging process.

SUMMARY OF THE INVENTION

In accordance with the present invention, an apparatus is provided for positioning at least one motor brush in an electric motor having a motor housing. The apparatus comprises a base ring secured to the motor housing; an upper ring disposed adjacent to and moveable relative to the base ring; and a mounting member movable between a fixed position and a released position. The mounting member, when in the fixed position is engagable with the upper ring and the base ring to prevent the relative movement of the upper ring and the base ring. When in the released position, the mounting member releases the engagement between the upper ring and the base ring to permit the relative motion of the upper ring and the base ring.

Preferably, the apparatus comprises a two piece, rotatable insulator for holding motor brushes. The insulator is preferably composed of an electrically insulating material such as machinable phonetic, machinable epoxies, polyesters, or other types of insulation material. The insulator includes a lower or base ring and an upper ring. The base ring is secured to the housing in which the motor is placed with two or more bolts, and is fixed in its position with respect to the motor housing. The base ring has a radially inwardly facing surface; three axially facing surfaces, and two radially outwardly facing surfaces of different diameters with the larger diameter surface location positioned for being disposed next to the motor housing. The reduced diameter radially outwardly facing surface provides a centering collar for the upper ring.

The outwardly facing outer surface of the base ring is used as mounting lip for positioning and connecting the lower ring to the housing via a bolt and washer combination.

The main portion of the upper ring comprises a ring having three axially facing surfaces and three radially facing surfaces. A radially outwardly facing surface is concentric with, and has a smaller diameter than the larger diameter radially outwardly facing surface of the base ring. The diameter is smaller so that the radially outwardly facing surface of the upper ring will be disposed radially inwardly from the radially outwardly facing surface of the base ring, thereby permitting the mounting bolts to clear the upper ring, and permit the upper ring to position itself flush against the base ring.

The two radially inwardly facing surfaces of the upper ring have different diameters. The larger diameter, radially inwardly facing surface is concentric with, and approximately the same diameter as the reduced diameter, radially outwardly facing surface of the base ring which is defined as the collar. The diameters of these two surfaces differ enough to allow for a slip fit assembly of the two components and the rotation of the upper ring relative to the base ring, but are close enough to maintain some frictional contact between themselves. The smaller diameter, axially inwardly facing surface of the upper ring in conjunction with the larger diameter, axially outwardly facing surface of the base ring provide a stop axial surface for the axially outwardly facing surface of the base ring.

The smaller, radially inwardly facing cylindrical interior surfaces of the upper ring and lower ring preferably have identical diameters that are large enough to provide sufficient clearance within the diameter of the smaller radially inwardly facing interior surfaces to provide clearance for other components of the motor. In addition to the ring portion, the upper ring has four platforms extending axially outwardly from the axially outwardly facing top surface of the ring. These platforms each have two axially extending apertures to accept bolts for securing the motor brush holder to the axially outer end of the platforms. The apertures have a reduced diameter portion through which the tail end of the bolt passes and a relatively enlarged diameter portion for receiving the head of the bolt. The enlarged diameter portion of the aperture is not cylindrical in its configuration. Rather, it should be slotted, ovaloid or hexagonal in cross section and approximately the size of the head of the bolt to provide at least two opposed flat surfaces to grip the flat sides of the bolt to impede rotational movement of the bolt.

The upper ring includes one or more axially extending indexing mounting bolt receiving apertures that extend entirely through the upper ring, and are alignable with one or more threaded axially extending indexing bolt receiving apertures that extend through the axially outwardly facing surface of the base ring, and partially through the base ring, thus holding the base and upper ring together. However, the indexing bolt receiving aperture of the base ring does not extend all the way to the axially inwardly facing surface of the base ring which is flush against the motor housing when installed in the motor.

These two indexing/mounting bolt receiving apertures also provide a way to index the angular relation between the two rings. When the apertures in each ring align, the upper ring is in its correct operating location relative to the base ring. As stated above, the position of the two rings is maintained by threading an indexing/mounting bolt into the indexing/mounting bolt receiving apertures of the rings. A second locating method calls for the use of a spring loaded detent or spring loaded pin instead of the bolt.

One feature of the present invention is that a rotatable insulator assembly is provided to facilitate the easy replacement of all motor brushes without requiring the disassembly or removal of the motor to service the brushes. This feature is accomplished through the use of a two ring configuration briefly explained above and in more depth in the following sections. The base and upper rings are held in place relative to each other with one or more indexing bolts.

Because of its configuration, removing the access door or doors of a typical motor housing usually allows for the easy replacement of at most two brushes. Once the first two brushes have been replaced with the insulator of the present invention, the indexing/mounting bolts are removed and the upper ring rotated 180° relative to the base ring.

When the upper ring is so rotated, the final two brushes are positioned adjacent to the opening in the access door and the first two brushes are positioned away from the access door thus permitting the easy replacement of the final two brushes. After the final two brushes are replaced, the upper ring is then rotated back 180° relative to the base ring and the indexing/mounting bolts are re-inserted. Depending on the position of the motor and the size of the access panel, it may be necessary to replace the brushes one at a time by incrementally rotating the upper ring by 90° three times after removing the first brush.

A second feature of the present invention is that the motor brush holder bolts that are passed through the apertures in the platforms of the upper ring to fasten the brush holder to the upper ring are spring loaded, and biased by the spring axially outwardly to maintain the threaded ends of the bolts in a position axially outwardly, and exteriorly of the axially outwardly facing surface of the platforms on the upper ring, while the head of the bolt is fixedly positioned against rotational movement so that the bolt does not freely rotate about its axis when the nut attached is being tightened or loosened.

These springs bias the bolts axially outwardly toward their threaded ends. The springs are positioned in the axially inner ends of the apertures of the platforms of the upper ring and are disposed between the axially outwardly facing surface of the base ring, and the head of the bolt to urge the head of the bolt axially outwardly away from the base ring. When the bolt is biased axially outwardly to its forwardmost position, the spring should still be under some compression to ensure that the bolt will maintain its forwardmost, axially outward position.

The enlarged diameter portion of the aperture for receiving the head of the bolt is disposed adjacent to the axially inwardly facing surface of the upper ring, and is not cylindrical in shape but rather slotted, ovaloid or hexagonal. The size of the enlarged portion should be large enough to allow the head of the bolt to pass into and move axially within the aperture, but small enough to engage the flat sides of the head of the bolt to impede the rotation of the head, thereby preventing the bolt from rotating freely in the upper ring.

A third feature of the present invention is that it permits the user to repeatably position the brushes in their proper angular position to maximize brush lifetime. The relative rotational (angular) position of the brushes can impact the operation of the motor and the life expectancy of the brushes. By providing an indexing means, such as the indexing bolt, the user can easily place the brush bracket holding upper ring in the same preferred rotational position after replacing the brushes.

These and other features of the present invention will become apparent to those skilled in the art through a review of the detailed description and figures set forth below, which set forth the best mode of practicing the invention perceived presently by the Applicant.

DETAILED DESCRIPTION

Figure 1:
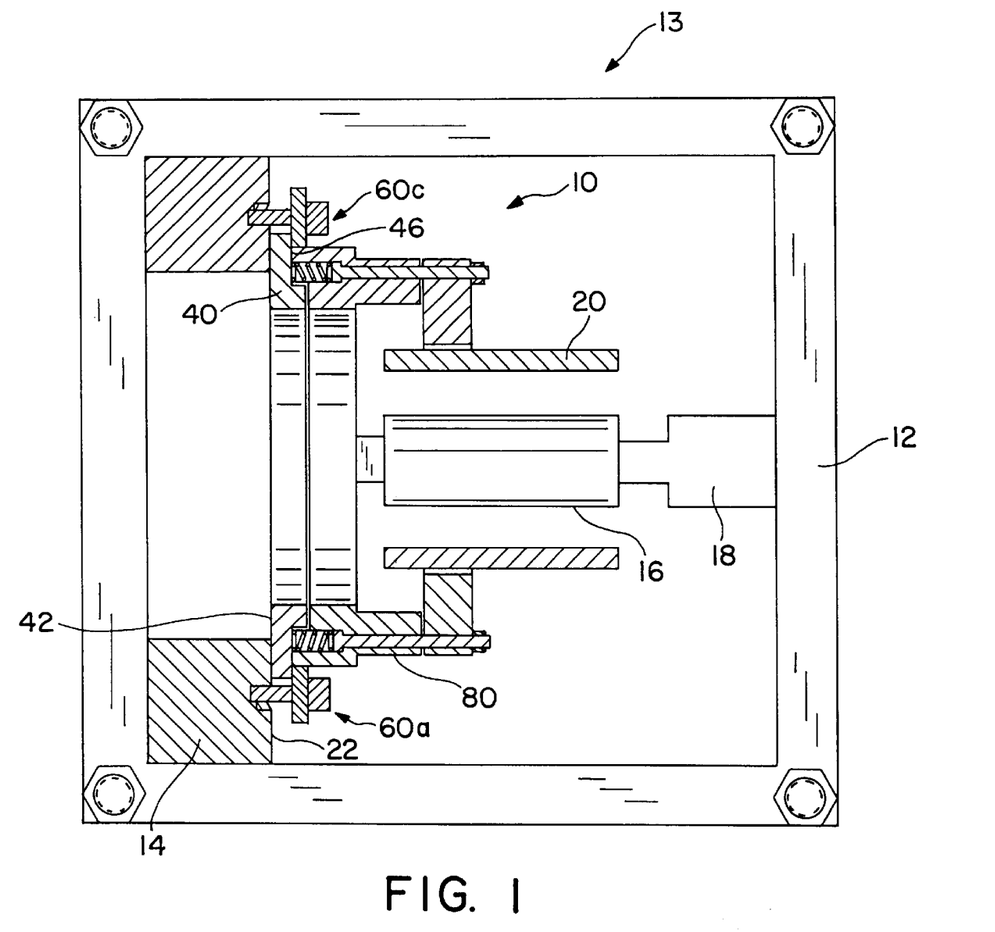
FIG. 1 is a side, partly-sectional view of the present invention assembled into an electric motor housing.
Figure 2:
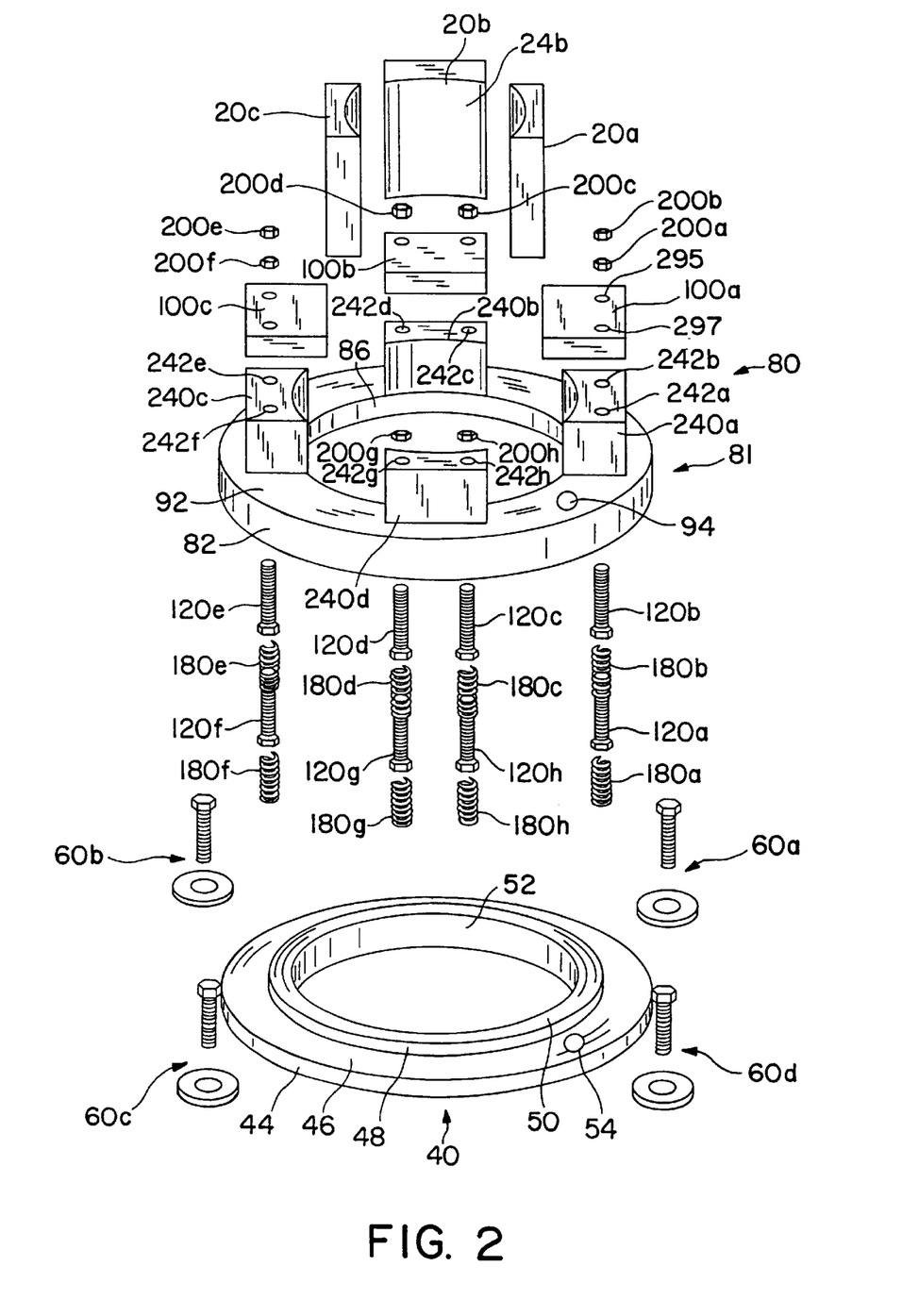
FIG. 2 is an exploded, assembly view of the present invention with one brush and brush bracket removed for clarity.

The insulator/brush holder ("insulator") 10 of the present invention is shown in FIG. 1 and FIG. 2. In FIG. 1, the insulator 10 is shown as being mounted in a motor housing cover 13. The motor components are visible through an access door 12 in the motor housing cover 13. The basic electric motor parts include: a motor housing ring 14 for housing the motor of the present invention, commutator 16, motor output shaft 18, and motor brushes 20. The insulator 10 includes the following components: a base ring 40; an upper ring 80, four bolts and washers 60a–d for fixedly clamping base ring 40 flushly to the motor housing ring 14, eight bolts 120a–h, eight nuts 200a–h and eight springs 180a–h.

Referring now to FIGS. 1–2 and 5–6, the base ring 40 includes three planar, radially extending, axially facing surfaces; three axially extending, radially facing surfaces; and a blind depth aperture for the indexing/mounting bolt or bolts 220. The axially inwardly facing underside surface 42 is positioned flush against the axially outwardly facing mating surface 22 of the motor housing ring 14. The axially outwardly facing surface 46 is offset from surface 42 by a distance sufficient to impart sufficient thickness to the base ring 40 to provide for rigidity of the base ring 40. The inner, axially outwardly facing surface 50 is offset from surface 42 by a distance sufficient to produce a collar for the upper ring 80 to slide onto. The collar is formed by an inwardly disposed, radially outwardly facing collar surface 48, that extends between the outer and inner axially outwardly facing surfaces, 46, 50 and whose extent is defined by the offset distance of surface 46 from surface 50.

The radially outwardly facing, perimetral surface 44 has a diameter larger than that of the collar surface 48. The diameter of the perimetral surface 44 is large enough to allow for sufficient room between the upper ring 80 and the perimetral surface 44 for the mounting bolts and washers 60a–d to engage the radially outer edge portion of the outer axially outwardly facing surface 46. The radially inwardly facing interior surface 52 has a diameter large enough to provide clearance for receiving other components of the motor.

Figure 6:
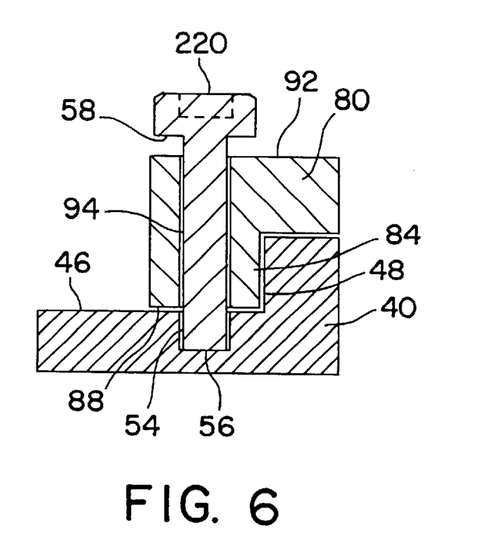
FIG. 6 is a sectional view of the indexing bolt or bolts taken along lines 6—6 of FIG. 3.

The base ring 40 includes an indexing portion 54. The indexing portion 54 is an axially extending aperture 54 which extends through surface 46, but not all the way through to underside surface 42. As best shown in FIG. 6 axially outwardly facing aperture base surface 56 defines the depth of the aperture 54 and illustrates that the indexing/mounting bolts receiving aperture 54 only extends through a portion of the base ring 40. The indexing/mounting bolt receiving aperture 54 allows the indexing bolt 220 to pass partway into the base ring 40, and to tighten rings 40 and 80 together.

The base ring 40 is fixedly coupled to the motor housing ring 14 with four bolt and washer combinations 60a–d. Bolt and washer 60a demonstrates this in FIG. 1 as being clamped onto surface 46 when threading bolt 60a into motor housing ring 14.

The four bolt and washer combinations 60a–d are each positioned about the base ring 40 by approximately 90° of separation, and are thereby cooperatively positioned about the base ring 40 to maintain the base ring 40 in its proper position on the motor housing ring 14.

Once all four bolt and washer combinations 60a–d have been positioned properly about the base ring 40, the bolts and washer combinations 60a–d secure the base ring 40 to the motor housing ring 14 in a fixed position.

Figure 5:
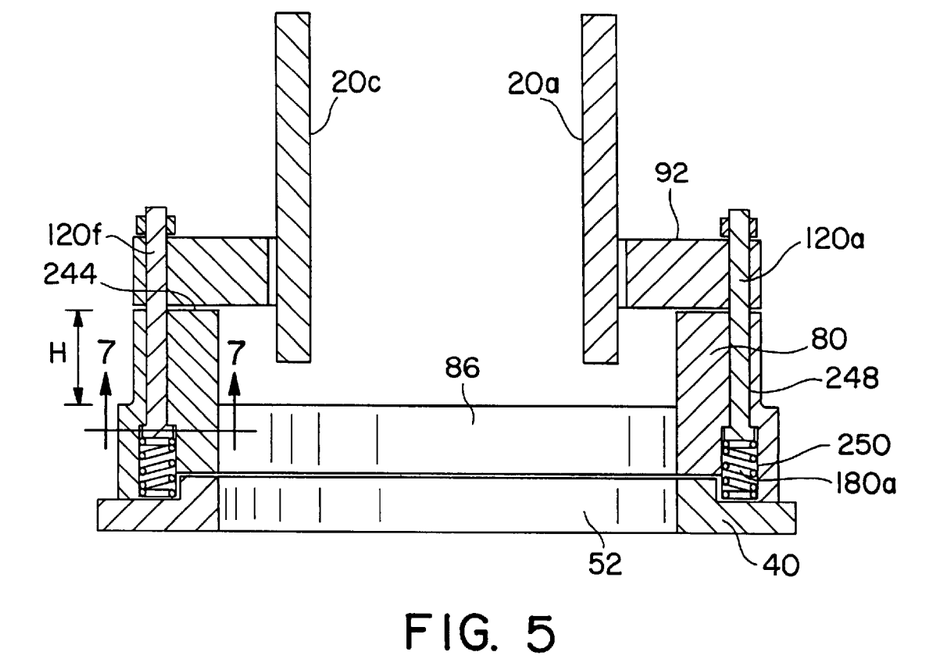
FIG. 5 is a sectional view taken along lines 5—5 of FIG. 3.

Turning now to FIGS. 2, 5 and 6, the upper ring 80 includes a generally washer-shaped body portion 81 and four axially outwardly extending platform members 240a–d. The body portion 81 includes three axially facing, radially extending surfaces and three radially facing, axially extending surfaces. A radially outwardly facing perimetral surface 82 is concentric with, and has a smaller diameter than the perimetral surface 44 of the base ring 40. The diameter of the perimetral surface 82 of the upper ring 80 is smaller to allow the radially outer edge of the outer, axially outwardly facing surface 46 to be exposed so that the bolt and washer combination 60a–d can grip the outer axially outwardly facing surface 46 of the base ring 40, to position the base ring 40 flush against the motor housing ring 14.

The two radially inwardly facing surfaces 84, 86 of the upper ring 80 have different diameters. The larger diameter radially inwardly facing surface 84 is concentric with and approximately the same diameter as the reduced diameter, radially outwardly facing collar surface 48 of the base ring 40. The radially inwardly facing surface 84 has a slightly greater diameter than the collar surface 48 to allow the radially inwardly facing surface 84 to interiorly receive the collar surface 48 to permit assembly of the base ring 40 and upper ring 80, and to permit the rotation of the upper ring 80 relative to the base ring 40, while maintaining the two surfaces 84, 48 close enough to maintain a frictional contact there between. The smaller diameter, radially inwardly facing interior surface 86 is concentric and approximately equal in diameter to the interior surface 52 of the base ring 40. As in the case of the interior surface 52 of the base ring 40, the diameter of the interior surface 86 of the upper ring 80 is chosen to ensure sufficient clearance for other electric motor components. The axially inwardly facing base surface 88 of the upper ring 80 is placeable flushly against the axially outwardly facing top surface 46 of the base ring 40. The outwardly facing top surface 92 of the upper ring 80 provides a surface for the indexing/mounting bolt 220 to tighten together base ring 40 and upper ring 80.

The upper ring further includes an indexing portion 94. The indexing portion 94 is an axially extending threaded indexing/mounting bolt receiving aperture 94 that extends entirely through the upper ring 80 from the axially outwardly facing top surface 92 of the upper ring 80 to the axially inwardly facing surface 88 of the upper ring 80 which is disposed flush against the base ring 40. The indexing/mounting bolts aperture 94 of the upper ring 80 is alignable with the indexing/mounting bolt receiving aperture 54 of the base ring 40. When the apertures 94, 54 in each ring 80, 40 align, the upper ring 80 is in its correct operating location relative to the base ring 40. The position of the two rings 80, 40 is maintained by threading the indexing bolt 220 through the apertures 94, 54 of each ring 80, 40 until the bolt head surface 58 bottoms out onto surface 92 of upper ring 80.

The upper ring 80 also includes four platforms 240a–d that extend axially outwardly from the axially outwardly facing top surface 92 of the upper ring 80. The height, H, of the platforms 240a–d is governed by the required position of the motor brushes 20a–d relative to the commutator 16 (FIG. 1). Each platform 240a–d is generally rectangular in cross-section, with the exception of radially inwardly facing interior surface 246 which is arcuately concave in cross-section, and is concentric with the other radially inward facing surface 86 of the upper ring 80. The distance between the radially inwardly facing interior surfaces 246 of a pair of opposed platforms (e.g. 240a and 240c; or 240b and 240d) is equal to or greater than the diameter of radially inwardly facing interior surface 86 of the upper ring 80.

Figure 7:
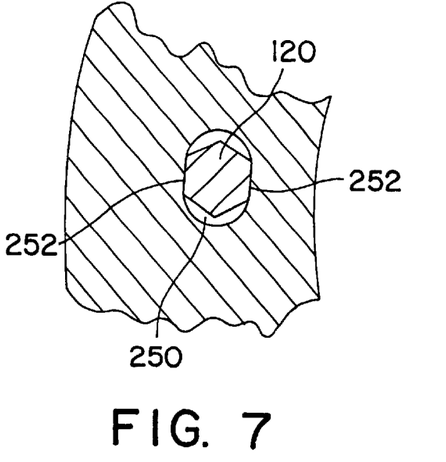
FIG. 7 is a sectional view taken along lines 7—7 of FIG. 5.

The platforms 240a–d each have a brush coupling member receiving portion 242a–h for receiving a brush coupling member 120a–h. Each of the platforms 240a–d, contain two axially extending platform apertures 242a–h to accept brushholder mounting bolts 120a–f (120h not being shown) for securing the motor brush brackets 100a–d to the axially outer ends 244 of the four platforms 240a–d respectively. The platform apertures 242a–h each have a reduced diameter portion 248 through which the tail end of the brush holder mounting bolts pass and a relatively enlarged diameter portion 250 for receiving the heads of the brush holder mounting bolts 120a–h. The enlarged diameter portions 250 of the platform 242a–h apertures are not cylindrical in their configuration, but rather should be slotted, ovaloid or hexagonal and sized to receive a head of one of the brush holder mounting bolts 120a–h, and to grip the opposed flat sides of the brush mounting bolts 120a–h to impede the free turning of the brush mounting bolts 120a–h about their longitudinal axis. As best shown in FIG. 7, the enlarged diameter portion 250 is slotted (ovaloid in cross-section) and has two flat, parallel surfaces (or "flats") 252 whose spacing is only slightly larger than the width of the head of the brush holder mounting bolts 120a–h to receive the head of the brush mounting bolts 120a–h, but will not permit rotation of the head of the brush mounting bolts about their longitudinal axis.

Figure 4:
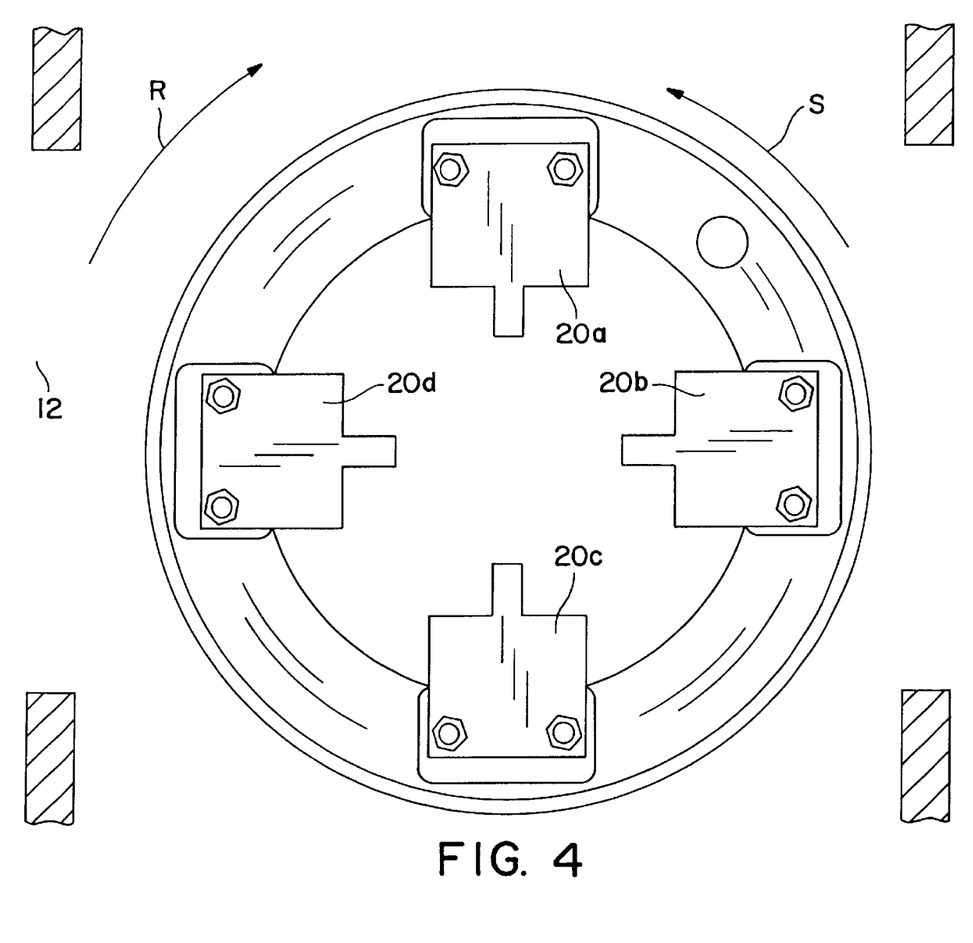
FIG. 4 a top, view with the indexing bolt removed and the ring rotated 90° relative to the view shown in FIG. 3.

The eight brush holder mounting bolts 120a–h are biased axially outwardly in the enlarged diameter portion 250 of the platform apertures 242a–h with a biasing member such as springs 180a–h. FIG. 4 shows this configuration for brush holder mounting bolt 120a and 120f. Looking at brush mounting bolt 120a–as an example, it is seen that the spring 180a is seated, at its axially outer end, on the axially inwardly facing surface of the head of brush holder mounting bolt 120a, and at its axially inner end on the axially outwardly facing top surface 46 of the base ring 40. To maintain the brush holder mounting bolt 120a in its forward-most position, spring 180a should still be under some compression even when the brush holder mounting bolt 120a is in its forward most position.

Brush holder mounting brackets 100a–d are attached to the axially outwardly facing end surface 244 of the platforms 240a–d of the upper ring 80 through the passage of the brush mounting bolts 120a–h through first and second brush holder bracket apertures 295, 297 that are found in each of the four brush mounting brackets 100a–d. Nuts 200a–h are secured to the tail ends of the brush mounting bolts 120a–h.

Figure 3:
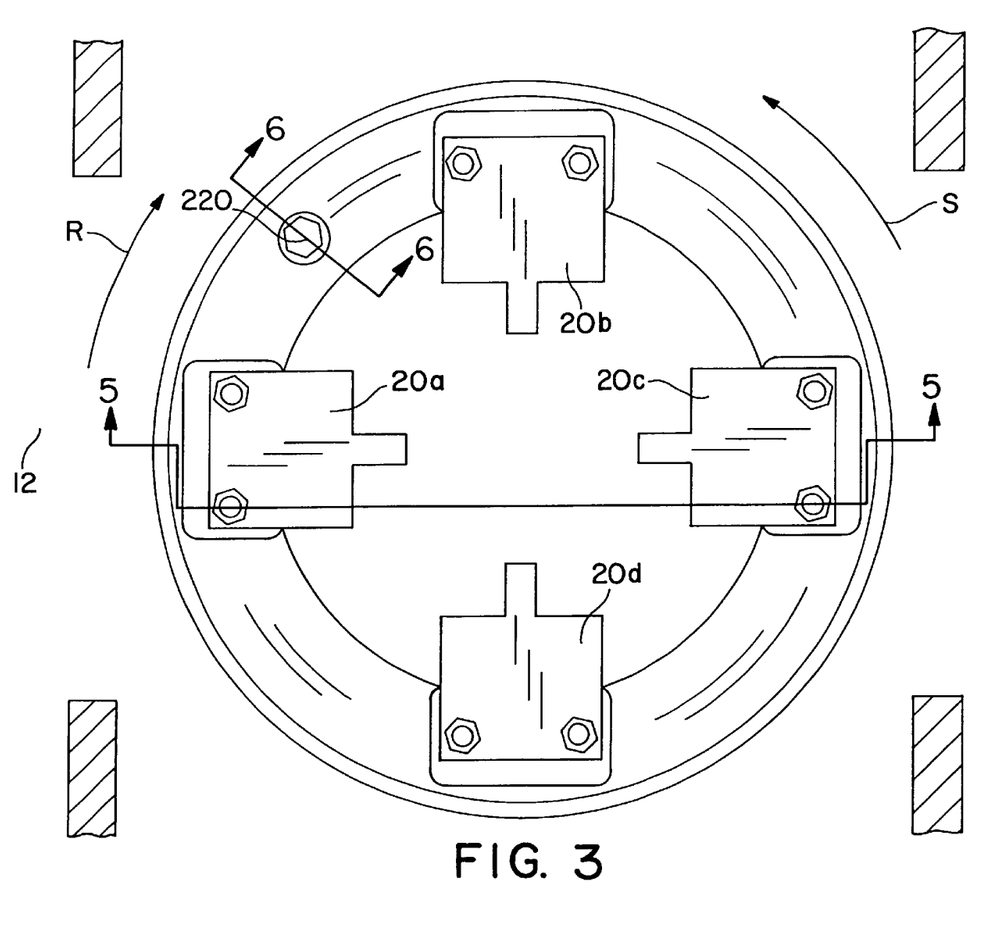
FIG. 3 is a top view of the present invention in its normal configuration and with brushes and brush brackets shown.

FIGS. 3 and 4 illustrate the operation of replacing the motor brushes. In FIG. 3 the indexing/mounting bolt 220 is in its proper operating position. Brushes 20a and 20b are accessible to the repair person through the access door 12. After these brushes 20a, 20b are replaced, the indexing/mounting bolt 220 is removed. The upper ring 80 is then rotated 90° relative to the base ring 40 as shown in FIG. 4 in a direction indicated by arrow R. This 90° rotation places brush 20d in a position where it is accessible to be replaced through the access door 12. Once brush 20d is replaced, the upper ring 80 is then rotated another 90° in the direction shown by arrow R to place brush 20c in an easily accessible position, adjacent to door 12 to facilitate its 20c replacement. After brush 20c is replaced, the upper ring 80 is rotated back 90° (in a direction shown by arrow S) relative to the base ring 40 to align apertures 54, 94.

The indexing/mounting bolt 220 is then re-inserted and tightened into its apertures 94, 54 to thereby fixedly positioning together the upper ring 80 and lower ring 40, to prevent any further rotation of the upper ring 80. When the indexing/mounting bolts 220 are reinserted into apertures 54, 94, the apparatus has been returned to its proper operating configuration as shown in FIG. 3. This method allows for easy brush replacement, and also maintains the proper critical position of the brushes relative to the commutator. Alternately, if the repair specialist finds it too difficult to replace brush 20b when it is in its fixed position (shown in FIG. 3), the upper ring 80 can be rotated forward in the direction of arrow R, 90° further than it is rotated to obtain access to brush 20c, to permit brush 20b to be positioned adjacent to access door 12, similarly to the position of brush 20a of FIG. 3.

Although the invention has been described in detail with respect to certain preferred embodiments, it will be appreciated by one skilled in the art that modifications and variations exist within the scope and spirit of the claims.

We claim:

1. An apparatus for positioning at least one motor brush in an electric motor having a motor housing, the apparatus comprising:
   a base ring secured to the motor housing, the base ring having a first indexing portion;
   an upper ring disposed adjacent to and moveable relative to the base ring, the upper ring having a second indexing portion; and
   an indexing member for engaging the first indexing portion and the second indexing portion for aligning the upper ring with the base ring, wherein:
     the base ring includes a first axially inwardly facing surface disposed adjacent to the motor housing and a second axially outwardly facing surface offset from the first axially inwardly facing surface;
     the first indexing portion is formed in the second, axially outwardly facing surface and extends into the base ring towards the first axially inwardly facing surface;
     the upper ring includes a third axially inwardly facing surface disposed adjacent to the second axially outwardly facing surface of the base ring and a fourth axially outwardly facing surface offset outward from the third axially inwardly facing surface; and
     the second indexing portion is formed in the fourth axially outwardly facing surface and extends through the upper ring to the third axially inwardly facing surface.

2. The apparatus recited in claim 1, wherein the upper ring is movable between a fixed and released position relative to the base ring, the first indexing portion of the base ring and the second indexing portion of the upper ring being positioned relative to each other such that the indexing member can pass through the second indexing portion and into the first indexing portion, when the upper ring is in the fixed position relative to the base ring.

3. An apparatus for positioning at least one motor brush in an electric motor having a motor housing, the apparatus, comprising:

a base ring secured to the motor housing, the base ring having a first indexing portion;

an upper ring disposed adjacent to and moveable relative to the base ring, the upper ring having a second indexing portion;

an indexing member for engaging the first indexing portion and the second indexing portion for aligning the upper ring with the base ring; and a brush coupling member, including a bolt having a head portion and a tail portion; wherein:

the upper ring includes at least one brush coupling member receiving portion, the at least one brush coupling member receiving portion including an enlarged portion sized to accommodate. the head portion of the bolt and a reduced diameter portion sized for receiving the tail portion of the bolt, and the enlarged portion of the at least one brush coupling member receiving portion includes at least one grip surface for engaging the head portion of the bolt and thereby preventing the rotation of the bolt relative the at least one brush coupling member receiving portion.

4. The apparatus recited in claim 3, wherein the apparatus further includes at least one biasing member disposed within the at least one brush coupling member receiving portion for biasing the position of the bolt within the at least one brush coupling member receiving portion.

5. An apparatus for facilitating the changing of at least one motor brush in an electric motor having a motor housing, the apparatus comprising:

an insulator ring secured to the motor housing and having a first surface disposed proximate to the motor housing, a second surface offset outward from the first surface and proximate to the at least one motor brush, and at least one brush coupling member receiving portion extending from the first surface to the second surface;

at least one brush coupling member disposed within the at least one brush coupling member receiving portion and extending partially outwardly from the second surface, wherein the at least one brush coupling member secures the at least one motor brush to the insulator ring; and at least one biasing member disposed within the at least one brush coupling member receiving portion inward relative to the at least one brush coupling member, wherein:

the insulator ring includes a base ring and an upper ring moveable relative to the base ring, the first surface of the insulator ring and the second surface of the insulator ring are disposed on the upper ring, and the base ring includes a third surface disposed adjacent to and in contact with the motor housing and a fourth surface offset outwardly from the third surface and proximate to the first surface of the upper ring.

6. The apparatus as recited in claim 5, wherein the biasing member comprises a spring disposed within the at least one brush coupling member receiving portion between a head portion of the at least one brush coupling member and the fourth surface of the insulator ring.

7. The apparatus as recited in claim 6, wherein the spring biases the bolt outwardly such that a tail portion of the bolt extends outwardly from the second surface of the insulator ring.

8. An apparatus for facilitating the changing of at least one motor brush in an electric motor having a motor housing, the apparatus comprising:

an insulator ring secured to the motor housing and having a first surface disposed proximate to the motor housing, a second surface offset outward from the first surface and proximate to the at least one motor brush, and at least one brush coupling member receiving portion extending from the first surface to the second surface;

at least one brush coupling member disposed within the at least one brush coupling member receiving portion and extending partially outwardly from the second surface, wherein the at least one brush coupling member secures the at least one motor brush to the insulator ring; and at least one biasing member disposed within the at least one brush coupling member receiving portion inward relative to the at least one brush coupling member, wherein:

the at least one brush coupling member receiving portion includes an enlarged portion and a reduced portion; and the at least one brush coupling member is a bolt having a head portion and a tail portion.

9. The apparatus as recited in claim 8, wherein:

the enlarged portion of the at least one brush coupling member receiving portion is sized to accommodate the head portion of the bolt; and the reduced portion of the at least one brush coupling member receiving portion is sized to accommodate the tail portion of the bolt.

10. The apparatus as recited in claim 9, wherein the enlarged portion of the at least one brush coupling member receiving portion includes at least one grip surface for engaging the head portion of the bolt for precluding the bolt from rotating relative to the at least one brush coupling member receiving portion.

11. An apparatus for positioning at least one motor brush in an electric motor which has a motor housing, the apparatus comprising:

a base ring having a first axially inwardly facing surface disposed adjacent to the motor housing, a second axially outwardly facing surface offset outward from the first axially inwardly facing surface, a first radially outwardly facing surface which defines the outward radial extent of the first axially inwardly facing surface and the second axially outwardly facing surface, a second radially outwardly facing collar surface disposed radially interiorly of the first radially outwardly facing surface, and a third axially outwardly facing surface which defines the depth of a first indexing member receiving portion;

an upper ring moveable relative to the base ring and having a fourth axially inwardly facing surface disposed adjacent to the second axially outwardly facing surface of the base ring, a fifth axially outwardly facing surface offset outward from the fourth axially inwardly facing surface, a third radially outwardly facing surface which defines the outward radial extent of the fourth axially inwardly facing surface and the fifth axially outwardly facing surface; a fourth radially outwardly facing surface which is concentric with and disposed next to the collar surface of the base ring, and a second indexing member receiving portion which is defined by a fifth radially inwardly facing surface which extends from the fourth axially inwardly facing surface through to the fifth axially outwardly facing surface; and.

an indexing member which is removably disposed within the first indexing member receiving portion and the second indexing member receiving portion for coupling the base ring and the upper ring together for preventing the motion of the upper ring relative to the base ring when the upper ring is in a first position relative to the base ring.

* * * * *